(No Model.)  H. C. HERR.  4 Sheets—Sheet 1.
WIRE STAPLING MACHINE.

No. 447,428.  Patented Mar. 3, 1891.

Witnesses.
Henry Ashbery
Robert A. Geary

Henry C. Herr, Inventor.
By James Sangster, Attorney.

(No Model.) H. C. HERR. 4 Sheets—Sheet 2.
WIRE STAPLING MACHINE.

No. 447,428. Patented Mar. 3, 1891.

Witnesses.
Henry Ashbery
Robert A. Geary

Henry C. Herr, Inventor.
By James Sangster,
Attorney.

(No Model.) 4 Sheets—Sheet 3.
H. C. HERR.
WIRE STAPLING MACHINE.
No. 447,428. Patented Mar. 3, 1891.
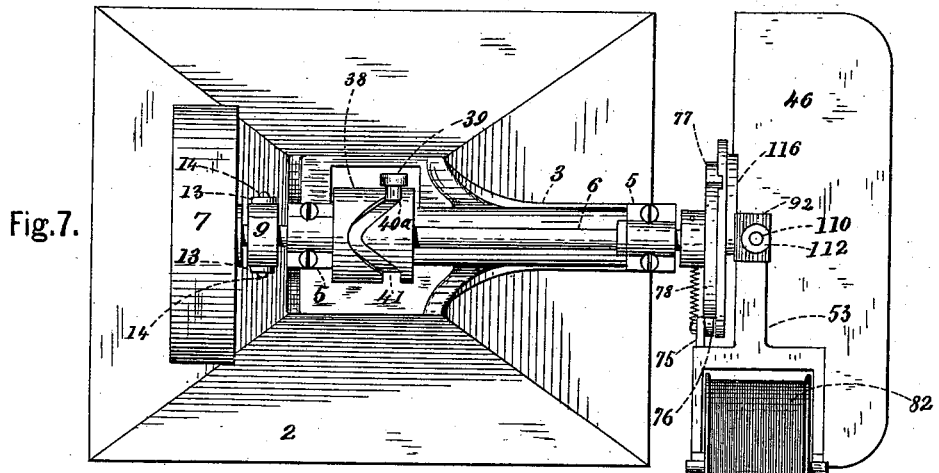
Fig. 7.
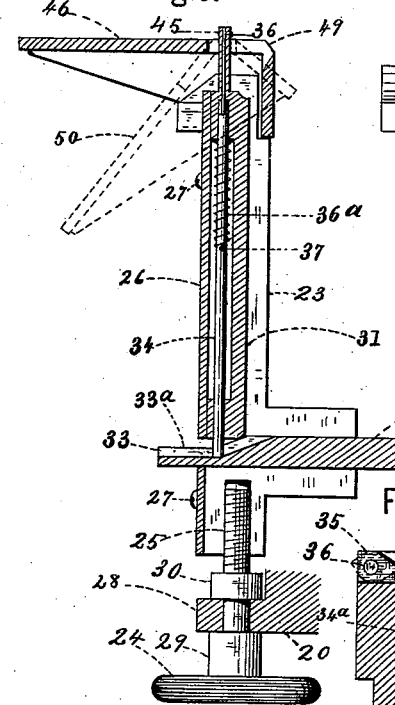
Fig. 8.
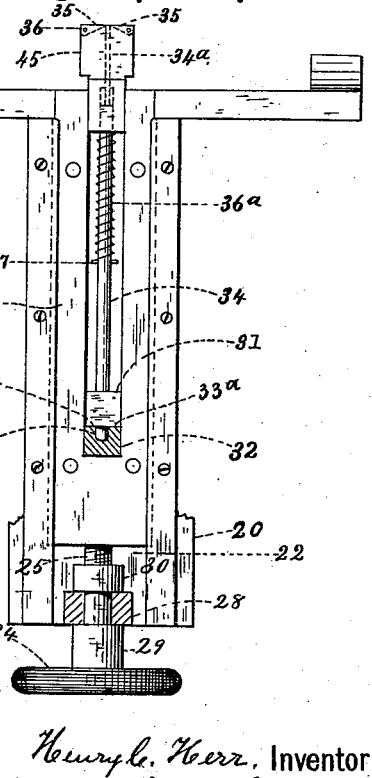
Fig. 9.
Fig. 10.
Witnesses.
Henry Ashberg
Robert A. Geary
Henry C. Herr, Inventor.
By James Sangster,
Attorney.

(No Model.) 4 Sheets—Sheet 4.

H. C. HERR.
WIRE STAPLING MACHINE.

No. 447,428. Patented Mar. 3, 1891.

Witnesses.
Henry Ashbery
Robert A. Geary

Henry C. Herr, Inventor.
By James Sangster
Attorney.

UNITED STATES PATENT OFFICE.

HENRY C. HERR, OF WILLIAMSVILLE, NEW YORK.

WIRE-STAPLING MACHINE.

SPECIFICATION forming part of Letters Patent No. 447,428, dated March 3, 1891.

Application filed November 25, 1889. Serial No. 331,421. (No model.)

*To all whom it may concern:*

Be it known that I, HENRY C. HERR, a citizen of the United States, residing in Williamsville, in the county of Erie and State of New York, have invented certain new and useful Improvements in Wire-Stapling Machines, of which the following is a specification.

My invention consists in certain improvements in stapling-machines for stapling books, pamphlets, or for other uses, and will be fully and clearly hereinafter described and claimed, reference being had to the accompanying drawings, in which—

Figure 1:
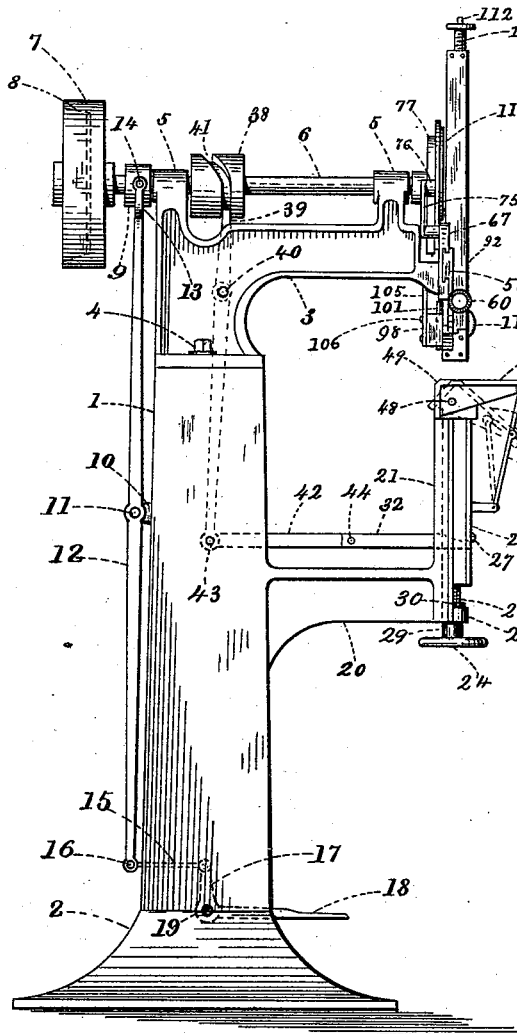
Figure 2:
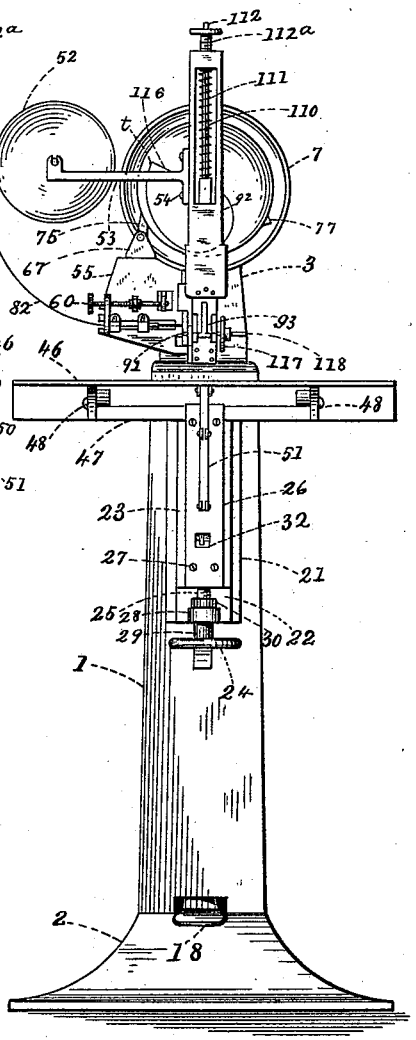
Figure 3:
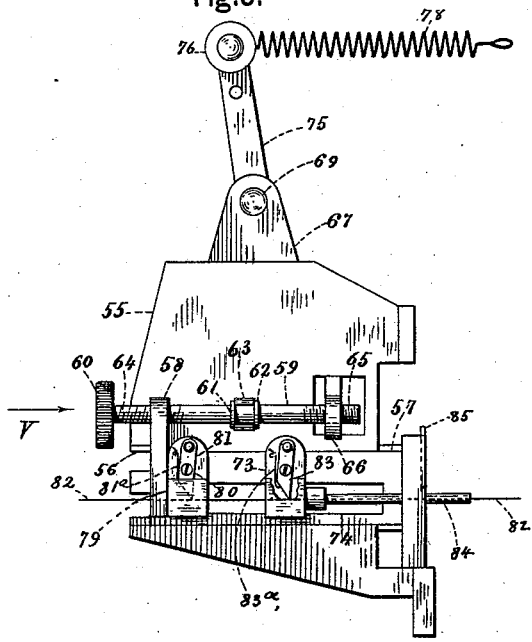
Figure 4:
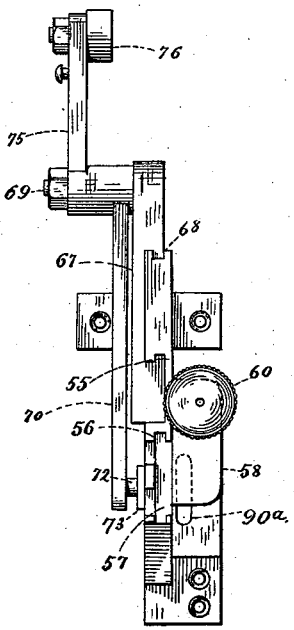
Figure 5:
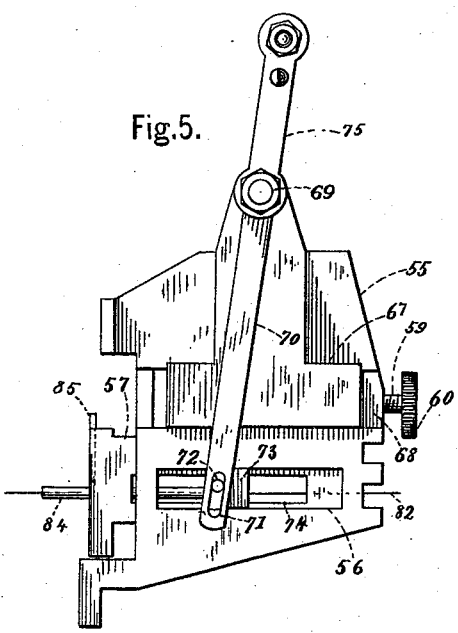
Figure 6:
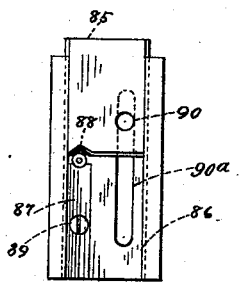
Figure 11:
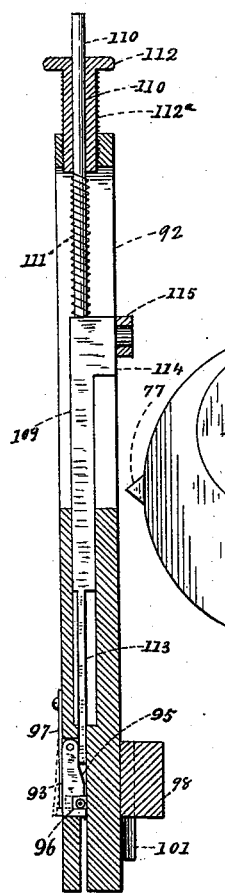
Figures 12, 13:
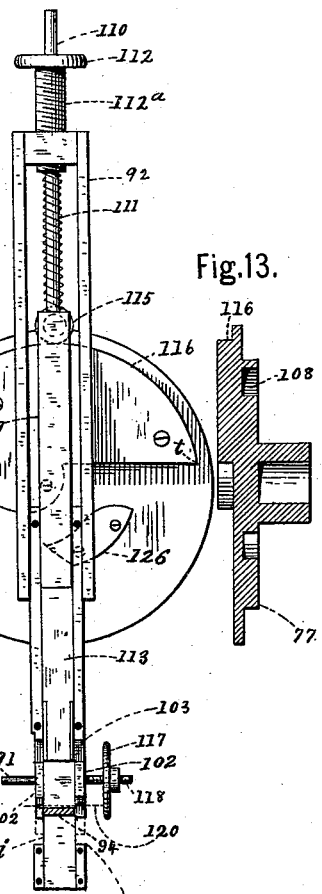
Figure 14:
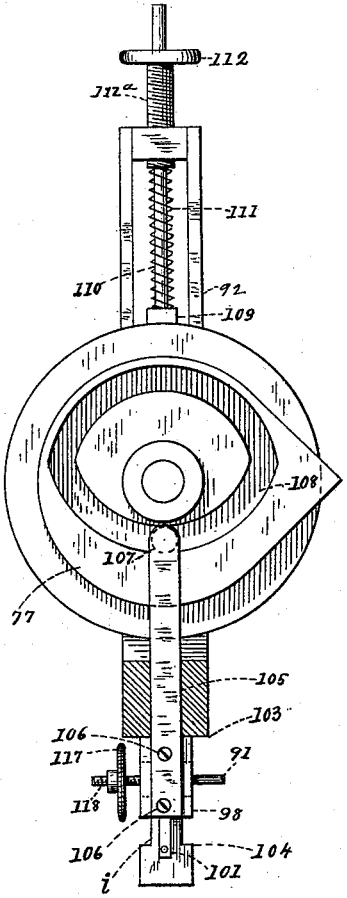
Figure 15:
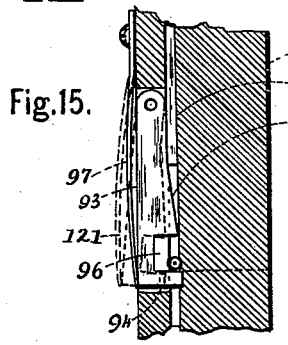
Figures 16, 17:
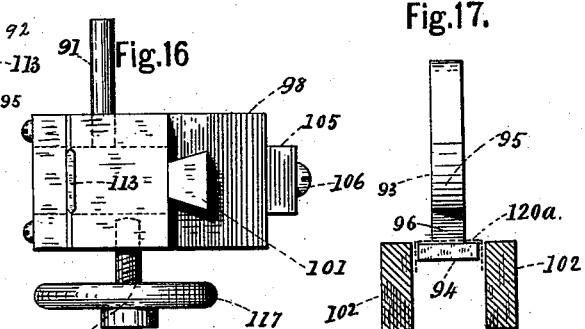
Figure 18:

Figure 1 is a side elevation of the machine, except the wire-holding frame, which is omitted to show the mechanism beyond it. Fig. 2 is a front elevation of the complete machine. Fig. 3 is an enlarged front elevation of the mechanism for feeding the wire to form staples. Fig. 4 is an end elevation of Fig. 3, looking in the direction of the arrow V, Fig. 3. Fig. 5 is an enlarged rear elevation of the wire-feeding mechanism. Fig. 6 is an enlarged front elevation of the cutter-head and cutter for cutting the wire. Fig. 7 is a top plan view of the machine. Fig. 8 is a detached sectional elevation, cutting vertically through the table, and a portion of the clinching mechanism. Fig. 9 is a front elevation of the same, the table being omitted and the front plate removed, so as to show the interior. Fig. 10 is an enlarged detached front sectional elevation of a portion of the clinching mechanism. Fig. 11 is an enlarged detached sectional elevation of a portion of the staple forming and driving mechanism. Fig. 12 is a front elevation of the same, showing in addition a front view of the cam for lifting the staple-driver. Fig. 13 is a central cross-section through the said cam. Fig. 14 is a rear elevation of Fig. 12. Fig. 15 is an enlarged sectional elevation of a portion of the device, showing a side elevation of the pivoted hooked arm over which the staple is formed and a similar view of a part of the staple-driver. Fig. 16 is an enlarged bottom view of the staple forming and driving case. Fig. 17 is a rear inside view of the staple-forming hook-arm and a vertical section cutting through the vertically-movable staple-forming device. Fig. 18 is a top view of the staple-former.

In Figs. 1 and 2 I have shown the machine complete. 1 is the supporting-body of the machine, and 2 the base, both of which are hollow and preferably formed of cast-iron in one piece. At the top of the hollow column or supporting-body 1 is an overhanging arm 3. It is secured at the rear by bolts 4 to the column 1. In this arm 3 is mounted in bearings 5 the driving-shaft 6, having at its rear end the driving-pulley 7, mounted so as to turn loosely thereon. This driving-wheel 7 is made hollow on the rear side, and directly opposite to it is a cone-shaped pulley 8, (shown by dotted lines in Fig. 1,) rigidly secured to the shaft 6 and adapted to fit within the correspondingly-hollow side of the driving-wheel 7.

Between the rear bearing 3 and the driving-pulley 7 is a small wheel 9, mounted so as to turn loosely on the driving-shaft 6, and at the back of the column 1 is a projecting lug 10, to which is pivoted, by a pin 11, an arm 12, having a forked upper end 13, pivoted by a pin or pins 14 to the small or loose pulley 9. The lower end of the arm 12 is pivoted to a short horizontal arm 15 by a pin 16, (shown partly by dotted lines in Fig. 1.) The opposite end of the arm 15 is pivoted to a short arm 17, projecting up from and forming a portion of the foot-step 18, which is pivoted at the base of the column by a pin 19. From this construction it will be seen that a pressure on the foot-step downward will cause the upper part of the arm 12 and the small pulley 9 to press against the hub of the pulley 7 and thereby force the wheel against the cone-pulley 8 with sufficient force to cause the operation of the machine, and the moment the foot-step is released the friction between the two pulleys is removed and the machine stops. It will be noticed that the pulley 7 is the driving-pulley to be run by a belt, and that when released from the friction-pulley it turns loosely on the shaft without operating the machine.

Projecting forward from the column 1 is a supporting portion 20, having an upwardly-projecting vertical portion 21, in the front of which is a slideway 22, in which the vertically-movable case 23 is fitted so as to be adjusted up or down by the hand-wheel 24 and its screw portion 25. This hand-wheel 24 and its screw portion 25 are prevented from moving vertically up or down in the lug 28 by the enlarged portion 29 and the collar 30, and as the screw 25 fits in a corresponding screw-threaded hole in the bottom of the movable case 23 it easily adjusts said case up or down by turning the hand-wheel. It also carries the clinching mechanism. (See Figs. 8, 9, and 10.)

The clinching mechanism consists of the vertically-movable bar 31, provided with a covering-plate 26, secured to its place by screws 27. (See Figs. 1, 2, and 8.) It is fitted so as to slide nicely up or down in the vertically-adjustable case 23, and is operated by the horizontally-movable inclined cam-bar 32, which passes or moves through the bar 31. This cam-bar 32 is provided with a cam-groove 33, into which the lower end of the bar 34 is fitted for operating the pointed clinching-bars 35, which are pivoted by pins 36 to the upper portion of the bar 31, (see Fig. 10,) in which these pivoted clinching-bars are shown. The vertically-movable bar 34 is provided with a spiral spring $36^a$, kept in its position by a pin 37. (Shown in Figs. 8 and 9.) Its object is to keep the bar in the groove in the cam 32. The cam-bar 32 receives its movements by means of a cam 38, rigidly secured on the driving-shaft 6. (See Fig. 1, showing those parts.) It will be noticed that the cam 38 is a grooved cam. An arm 39 is pivoted to the overhanging arm 3 by a pin 40, so that a friction-roller $40^a$, (shown in Fig. 7,) secured by a pin to its upper end, projects into the cam-groove 41, and its lower end is pivoted to a connecting-rod 42 by a pin 43. The opposite end on the rod 42 is pivoted by a pin 44 to the rear end of the cam-bar 32. (See Fig. 1.) From this construction it will be seen that as the shaft 6 turns, the cam-bar 32 will have a reciprocating movement, and as it thus moves it gives an up-and-down movement to the bar 31, and also the bar 34, for operating the clinchers 35, the cam being set on the shaft so as to give the movements exactly at the proper time. The clinchers 35 are pivoted in the flat portion 45 of the bar. (See Figs. 8, 9, and 10.) They are shown by dotted lines in Fig. 9, and are made very thin and flat, so as to work within the flat portion, as shown.

In Figs. 1, 2, 7, and 8 I have shown the pivoted table 46. It is pivoted to the cross-piece 47 by bolts 48. (Shown in Figs. 1 and 2.) It is pivoted so that the narrow flat portion 49 will be at the same height as the top of the table when turned in the position shown by the dotted lines 50 in Figs. 1 and 8. When raised up to form a flat table, as shown in Fig. 1, it is securely held in place by the toggle-joint 51, (shown in Fig. 1,) the object being to adapt the table to be used either as a flat table or as a saddle-table when required.

The construction and operation of the wire-feeding mechanism and the staple forming and driving devices are as follows:

In Figs. 2 and 7, 52 represents the reel for carrying the wire. It is supported in a frame 53, attached to the machine by bolts 54.

Just below the reel 52 is located the feeding mechanism. (See Figs. 1 and 2, more particularly Figs. 3, 4, 5, and 6.) It is mounted on a supporting-frame 55, which frame is secured to the machine by bolts or screws in the usual way. In the supporting-frame 55 is a slideway 56, in which is nicely fitted the adjustable bar 57, so that it may be adjusted back and forth in the slideway. At the rear of the bar 57 is a lug 58. Projecting outward from the face of the frame 55 through the upper portion of the lug 58 passes an adjusting-screw 59, provided with a thumb-screw 60. This screw-bar 59 is prevented from moving longitudinally back and forth by means of two collars 61 and 62 and a concave lug 63, in which the screw-bar is mounted, so as to turn easily. This screw-bar 59 is provided with a screw-thread at each end. The large thread 64, (see Fig. 3,) which is a left-hand screw-thread, has sixteen threads to the inch, and screws through a lug 58, as before mentioned, thereby providing the means for adjusting the bar 57. The right-hand screw-thread 65 on the opposite end of the bar 59 is a finer screw of forty-eight threads to the inch. This end of the screw passes through a lug 66, projecting forward from the adjustable sliding plate 67, which plate 67 is mounted in a horizontal slideway 68, (see Figs. 4 and 5,) and carries the fulcrum or bearing pin 69, upon which the arm or lever 70 for operating the feeding device is mounted. This lever 70 is provided at its lower end with a slot 71, through which a pin 72 passes (see Figs. 4 and 5) from the feeding-carriage 73. (Shown in Figs. 3, 4, and 5.) This feeding-carriage 73 slides back and forth in the opening 74 in the adjusting-bar 57. The upper portion 75 of the arm 70 is provided with a friction-roller 76. (Shown in Figs. 1, 3, and 4.) This roller and arm 70 75 is operated on by a cam 77, which is rigidly secured to the driving-shaft 6 and turns with it and is formed so that it gives the proper reciprocating movements to the feeding-carriage, (see Figs. 1, 2, 12, 13, and 14,) in which the cam 77 and portions of it are shown. The cam 77 gives the proper movement to the feeding-arm one way, and the spring 78 keeps it up to the cam.

To the adjusting-bar 57 is secured a lug 79, having pivoted thereto by a pin 80 a dog 81, for preventing the staple-wire 82 from being drawn backward. (See Fig. 3.) This dog 81 is kept to the wire 82 by a spring $81^a$.

The feeding-carriage 73 is provided with a feeding-dog 83, which holds the wire when moving and carrying it forward, (being kept to the wire by a spring $83^a$;) but it slips easily over the wire when moving backward.

To the front of the feeding-carriage 73 is rigidly secured a small tube 84, through which the wire passes and is carried to the staple-former. The object of this tube is to protect the wire at that point.

At the front of the bar 57 (see Figs. 3, 5, and 6) is the wire-cutter 85, which is fitted in a dovetail slideway 86 so as to be moved easily up and down in the slideway.

The stationary cutter 87 (shown in Fig. 6) is located just below the cutting-edge 88 of the movable cutter and is secured in place by a screw 89. (See Fig. 6.)

In the movable cutter is a hole 90, through which a pin 91 (see Figs. 2, 12, and 13) from the staple-former passes and from which it receives its proper cutting movements, and 90$^a$ is a slot in the supporting-piece to permit the pin 91 to move up or down.

To the overhanging arm 3 (see Figs 1 and 2) is rigidly secured a vertical supporting-frame 92, arranged in a line with and directly over the portion 21. In this supporting-frame is the staple forming and driving mechanism. (See Figs. 2, 11, 12, 13, 14, and 15, in which the staple-driving mechanism is shown.)

The staple-forming mechanism consists, first, of a pivoted swinging former 93 (shown in Figs. 2, 11, 15, and 17) and a section through the inward-projecting lug 94, over which the wire passes preparatory to being formed, as shown in Fig. 12. This lug 94 is a part of the former 93 and projects forward from its inner face. Above the lug 94 is an inclined projecting surface 95, (shown in Figs. 11, 15, and 17,) leaving the opening 96 at the bottom between it and the lug 94, thereby leaving room for the wire forming the staple to pass through. This swinging pivoted staple-former 93 is kept in its normal position, as shown in Fig. 15, by a spring 97, (shown in Figs. 11 and 15,) the spring 97 being omitted in Fig. 2.

To the lower reduced portion of the vertical frame 92 is a vertically-sliding staple-former consisting of the back portion 98, having a dovetail-shaped opening 100, (shown in Fig. 18,) adapted to slide up and down on the corresponding dovetail guideway 101. (Shown in Figs. 1, 11, 14, and 16.) Projecting forward from the portion 98 and forming a part of it are two lugs 102, which lay close to the sides of the reduced portion $i$ of the vertical frame 92, and, together with the back portion 98, have a vertical up-and-down movement between the points 103 and 104, (shown in Figs. 12 and 14,) which points limit its movement either way. This vertically-movable staple-former receives its vertical up-and-down movements at the exact times required to form a staple by means of a connecting-bar 105. (Shown in Figs. 1, 14, and 16.) The lower end of the bar 105 is connected to the back portion 98 of the sliding staple-former by screws 106. (Shown in Figs. 1, 14, and 16.) The upper end of the bar 105 is provided with a friction-roller 107, (see Fig. 14,) in which this friction-roller is shown by dotted lines. It projects into and receives its movements from the groove-cam 108. (Shown in Figs. 13 and 14.) This cam thus gives the sliding staple-former its proper up-and-down movements. The staple-driver is a vertically-movable bar (see Figs. 11, 12, 14, and 15) consisting of the square or substantially square portion of steel 109. The upper portion 110 of the portion 109 is round, and is provided with a surrounding spring 111. The top of this spring 111 rests against the bottom of the adjusting thumb-screw 112 112$^a$, and through which the round portion of the bar passes. The lower end of the spring rests against the shoulder or top of the square portion 109. The object of the spring and the thumb-screw is to regulate the pressure of the bar downward. The lower portion of the staple-driver consists of a flat thin portion 113, (see Figs. 11, 12, 15, and 16,) which is the staple-driving portion, and is preferably made of hardened steel. The upper part of the square part of the bar is provided with a lug 114, to which is pivoted a friction-roller 115. (See Figs. 11 and 12.) This friction-roller 115 rides on the periphery of the cam 116, (shown in Figs. 1, 12, and 13,) and gives the staple driver its required upward movement, and the spring 111 gives it the return movement or driving movement.

The device for feeding the wire may be adjusted to feed any distance required, so as to make it answer for any sized staple that may be used, by means of the adjusting-screw 60, which moves the fulcrum-pin of the arm 70 75, which operation, as will be seen, moves the arm 75 and its frictional roller 76 either toward or from the cam 77, so that when it is adjusted so that the roller 76 will lie close to the cam it will receive the full motion of the cam, and consequently will give the longest feed to the wire for the longest staple, but when adjusted so that it cannot touch the lower portion of the cam the feed will be shortened in proportion to the distance between it and the lowest portion of the cam; but the construction is such that the feed always starts from a fixed point, because the lug 58 is a stationary lug projecting from the bar 57, so that the feeding-cam 73 always starts from the stationary lug 79 and moves more or less forward, according to the adjustment of the feeding device.

The operation of the machine is as follows: The staple-wire 82 being taken from the wire-roll 52 and put into the feeding device, (see Figs. 2, 3, and 5,) and the machine being put in motion, the cam 77 starts the feeding mechanism, as before mentioned. The cam 108 also starts the staple-forming lugs 102 upward, so as to allow the wire to pass below them to the gage-wheel 117, as shown by the dotted lines 120 in Fig. 12. The feeding mechanism carries the wire forward until it passes through and within the opening 96, and over the top of the lug 94, until stopped by the adjusting gage-wheel 117, which may be screwed back and forth on the screw-rod 118, so as to adjust it for any required length of staple. The lugs 102, having reached their upward movement just before the wire passes in, now begin their downward movement, the first part of which movement causes the pin 91 (which is in engagement with the cutter in the hole 90, as before mentioned,) to pass down and cut off the proper length of wire to form a staple. The remaining downward movement brings the former lugs 102 in the position shown in Fig. 17, and forms the staple, as shown by the dotted lines 120ª. The driver 113 has in the meantime been moving up, it being carried against the force of the spring 111 by the cam 116 until the point $t$ passes the friction-roller 115, when it is instantly forced down by the spring 111 with sufficient force to drive the staple through any article which may be interposed. After the staple-driver has driven the staple it is held down by the cam 126. (Shown in Fig. 12.) This holds the top of the staple rigidly while the clinchers are completing their work. At the same time the staple-driver comes down the clinchers 35 (shown in Figs. 9 and 10) act and turn the wire over on the under side of the article stapled, as above described. It will be noticed that the staple-driver 113 as it comes down first strikes the inclined portion 95 of the pivoted former 93 and thereby throws it out, as shown by the dotted lines 121 in Fig. 15, so as to draw the lug 94 away from the staple-driver 113 to drive it. In this way the staple is wholly completed within the vertical case 92 and then released and driven as above described, and the staple may be easily adapted to the thickness of any article to be stapled.

The office or object of the hand-wheel 24 (shown in Figs. 1, 2, 8, and 9) is to provide the means for regulating or raising and lowering the table—that is, the bar 23, having the cross-piece 47, to which the pivoted table is attached. It also raises at the same time the thin flat portion 45 of the clinching-bar. The table, it will be noticed, is really a double table, or two tables formed in one piece—the large flat table 46 and the saddle-table 49—and that by merely turning it on its pivots to one side or the other it will instantly change it either to a large flat table, as designated by the numeral 46, or to a narrow saddle-table (designated by 49) with inclined sides, as shown by the dotted lines 50 in Figs. 1 and 8.

The top of the upper part 45 of the clinching-bar may properly be termed the "anvil." This device for raising and lowering the table and anvil adapts the machine to be used for stapling books or other articles of any desired thickness, and, furthermore, it provides a convenient means for readily compressing the articles to be stapled to any required point, and when so stapled they will be held tightly and closely together.

By referring to Figs. 8 and 9 it will be noticed that the sides 33ª of the grooved cam 33 also act as a horizontally-movable inclined cam on each side of the groove, the object of which is to raise the vertically-movable bar 31, which bar moves upward and reaches the extreme limit of its upward movement a very little time before the bar 34, as it moves up, reaches the limit of its upward movement. After the height of the table has been properly regulated or adjusted to suit the thickness of the article or book to be stapled the object of this slight movement upward of the bar 31 is to tighten the anvil rigidly against the article while being stapled, which it does automatically, substantially in the manner described.

In adjusting the table as a broad flat table it will be noticed that the toggle-joint straightens out and the table cannot be disturbed without bending the toggle-joint inward, as shown in Fig. 1.

If any articles to be stapled—such as books, pamphlets, or other things—should be put into the machine to be stapled without being compressed, as above described, it would be difficult to get the staples properly through them, and if they did get through they would not be securely fastened, and any article so stapled would be practically useless.

I claim as my invention—

1. The combination of the staple-wire-feeding mechanism of a wire-stapling machine with a tube 84, adapted to move with the feeding mechanism and with the wire in its forward movement and to slide back over the wire on the backward movement of the feed for protecting the wire as it is being carried into the machine, substantially as described.

2. In a wire-stapling machine, the combination therewith of a feeding-carriage mounted in a slideway and provided with a tubular portion 84, that moves back and forth with it for protecting the staple-wire in its forward movement, a pivoted dog kept in its place by a spring for carrying the wire forward during every forward movement of the carriage and tube 84, a dog for preventing the backward movement of the staple-wire, and a means, substantially as above described, for giving the feeding-carriage its forward movements, substantially as hereinbefore set forth.

3. In a wire-stapling machine, the combination of an adjusting-bar 57, fitted in a substantially horizontal slideway in the frame 55 and carrying in a slideway within itself the feeding-carriage, a lug 58 at the rear of the bar 57, projecting outward, a sliding plate 67, fitted in a substantially horizontal slideway in the rear of the frame 55 and carrying the pivoted arm for operating the feeding-carriage, a lug 66, projecting forward from the plate 67 through the frame 55, and an adjusting-rod 59, provided with a thumb-piece 60 and with a screw-thread at each end, one right and the other left handed, the screw portions being mounted in lugs 58 66, the rod 59 being mounted so as to turn in a stationary bearing on the frame 55, so as to prevent any longitudinal movement, and thereby provide the means for adjusting the length of the feeding movement, substantially as described.

4. A feeding mechanism for a wire-stapling machine, consisting in the combination of an arm 70 75, pivoted to the frame and having a friction-roller 76 pivoted to its upper end and its lower end pivoted to the feeding-carriage, a pivoted dog on the feeding-carriage for moving the wire forward, a stationary dog for preventing backward movement of the wire, a cam for operating the pivoted arm and giving the feeding-carriage its proper feeding movement, and a spring for giving it its return movement, substantially as described.

5. In a wire-stapling machine, the combination of a cutter 85, mounted in a vertical slideway in the head of the adjusting-bar carrying the feeding mechanism, and through which the wire is fed to be cut into proper lengths, a pin projecting from the side of the staple-former 102 into a hole in the cutter, a bar 105, connected to the staple-former, provided with a friction-roller 107 and a groove-cam 108, into which it fits, for giving the former and cutter the proper up-and-down vertical movements for cutting the wire at the proper time, substantially as described.

6. In a wire-stapling machine, the combination of a vertically-movable staple-former for bending the staple over a former and a means, substantially as described, for giving it its required vertical movements, a staple-driver for driving the staple, and a cam and spring for giving it its proper movements, and a pivoted staple-former, over which the staple is formed, having substantially the projecting portion 94, opening 96, and inclined portion 95, whereby the staple is formed into shape, the portion 94 is forced out of the way and away from the staple as the driver comes down to drive it, substantially as described.

7. In a wire-stapling machine, the combination of a pivoted swinging staple-former having a projecting portion over which the staple-wire passes and is formed, and provided with an inclined portion 95, a spring for keeping it in its normal position, and a staple-driver for forcing it out of the way while a staple is being driven, substantially as described.

8. In a wire-stapling machine, the combination, with the feeding mechanism and the vertically-movable staple-former, of a gage-wheel 117, mounted on a screw-shaft rigidly secured to one side of the vertically-movable staple-former opposite to the feeding mechanism, so as to be adjustable, substantially as described.

9. In a wire-stapling machine, the combination therewith of a staple-driving mechanism mounted in a vertical supporting-case and consisting of the lower staple-driving portion 113, the round portion 110, projecting up through the top of the supporting-case to keep it in alignment, a spring for holding it down, a friction-roller 115, and a cam 116 for raising it up and then releasing it to permit the spring to act and drive it home on its return movement, substantially as and for the purposes described.

10. In a wire-stapling machine, the combination, with the staple-driver, of a spiral spring 111, and a vertically-adjusting screw for regulating the force of the staple-driver in its downward movement and thereby adjusting the force of the blow as it strikes upon the staple, substantially as and for the purposes described.

11. In a wire-stapling machine, a single supporting-table pivoted to a stationary portion of the machine, substantially as above described, so that different sides can be turned up for use, thereby adapting it to be used either as a broad flat table 46 or as a narrow or saddle table 49, in combination with a toggle-joint 51 for holding it in position as a broad flat table or permitting it to be turned so as to use the narrow saddle-table, the pivots 48 being placed, substantially as above described and shown, so that either table is of substantially the same height when brought into use, as above described.

12. In a wire-stapling machine, the combination of a bar 31, mounted in the case 23, so as to be movable up and down therein, and carrying the pivoted clinchers 35, a bar 34, mounted within the bar 31, so as to have a vertical movement for operating the clinchers, a grooved cam 33 33$^a$ for giving the bars 31 and 34 their required vertical movements, and a spring for keeping the bar 34 in engagement with the cam 33, an arm pivoted to the column 1, having its lower end pivoted to the cam-bar 32 and its upper end in engagement with a grooved cam on the driving-shaft for operating the clinching mechanism, substantially as described.

13. In a stapling-machine, the combination therewith of a vertically-movable case 23, carrying the clinching-mechanism bar 31, and a hand-wheel 24 for adjusting it vertically, substantially as hereinbefore set forth.

14. In a wire-stapling machine, the combination of the bar 31, mounted so as to be movable vertically in the case 23, pivoted clinchers 35 within the upper portion of the bar 31, a bar 34, mounted so as to move vertically within the bar 31, a spring for keeping it down in its normal position, and a cam for moving it up against the force of the spring and operating the clinchers, substantially as described.

15. In a wire-stapling machine, the combination of a bar 31, carrying the clinching mechanism, with a cam 33$^a$ on the cam-bar 32, and mechanism, substantially as above described, for giving the cam its required reciprocating movements and giving the bar 31 a slight movement upward while the clinching mechanism is in operation, substantially as described.

16. In a wire-stapling machine, a double table formed in one piece and pivoted to the machine so that it may be turned upward and used as a broad flat table or turned down and used as a narrow saddle-table, in combination with mechanism consisting of the hand-wheel 24 and the portion 23, by which the table is supported and adjusted, substantially as described.

17. In a wire-stapling machine, the combination of a double table 46 and 49, having its supporting-pivots located at equal distances from the surface of the table, so that either will be at the same level when turned up for use, a cross-bar 47, to which the table is pivoted, a vertically-adjustable portion 23, forming a part of the cross-bar 47 and kept in position by a slideway in which it is secured, and a hand-wheel for adjusting the same and the double table, substantially as described.

18. In a wire-stapling machine, the combination of a staple-driver 113, mounted in a vertical supporting-case, a spring for holding it down, a friction-roller 115, pivoted to the staple-driver, a cam 116 for moving it up against the force of the spring and then releasing it to permit the spring to drive it home on its return movement, and a cam 126 for holding it rigidly down until the clinching mechanism completes its action, substantially as described.

HENRY C. HERR.

Witnesses:
HARRIET JOHNSON,
JAMES SANGSTER.